UNITED STATES PATENT OFFICE.

THOMAS STERRY HUNT AND JAMES DOUGLAS, OF NEW YORK, N. Y.; JAMES DOUGLAS EXECUTOR OF SAID HUNT, DECEASED.

PROCESS OF SEPARATING COPPER FROM CUPRIFEROUS NICKEL ORES.

SPECIFICATION forming part of Letters Patent No. 483,924, dated October 4, 1892.

Application filed September 12, 1891. Serial No. 405,532. (No specimens.)

*To all whom it may concern:*

Be it known that we, THOMAS STERRY HUNT, a citizen of the United States, and JAMES DOUGLAS, a citizen of Great Britain, both residing at New York city, in the county of New York and State of New York, have invented certain new and useful Improvements in Processes of Separating Copper from Cupriferous Nickel Ores; and we do hereby declare the following to be a full, clear, and exact description of the invention, such as will enable others skilled in the art to which it appertains to make and use the same.

This invention relates to the process of separating copper from nickeliferous ore or matte and the making of a nickeliferous iron alloy which can be used in the manufacture of nickel steel.

The improvement consists of the novel features, which hereinafter will be more fully described and claimed.

Nickel is now used in the manufacture of nickel steel. The small proportion of nickel required for this purpose may be added to the charge of steel in the form of an alloy of nickel and iron, in the same manner as spiegeleisen is used in the manufacture of Bessemer steel.

The following series of operations is proposed as an economical method of making such a compound of nickel and iron from ores and mattes carrying copper, nickel, and iron:

First. In the case of naturally-oxidized ores roasting may be omitted; but sulphureted ores and mattes must be crushed and roasted till thoroughly oxidized.

Second. The roasting may be effected in any suitable furnace; but as sulphurous-acid gas is used in a subsequent operation a furnace from which this gas mixed with a regulated quantity of air can be collected should be preferred.

Third. The ore or matte when thoroughly roasted must be digested in a solution containing about ten per cent. of oil of vitriol till all the copper is dissolved. There will be at the same time dissolved a variable proportion of the nickel and a small quantity of the iron present in the roasted ore or matte.

Fourth. There is thus obtained for further treatment the insoluble portion A of the ore or matte remaining after the solution of such ingredients as the acid has dissolved. This we shall call the "residue." B is the solution of the copper, nickel, and iron, which we shall call the "bath."

Fifth. The residue A contains in the case of ore—such as that of Sudbury, Canada—iron and nickel oxides with silicious gangue, but in the case of matte iron and nickel oxides only. The residue from ores may be reduced to nickeliferous iron in the blast-furnace, after being pressed into bricks when necessary, either alone or mixed with other ores. The residue from matte can be similarly treated, or, if preferred, mixed with carbonaceous matter and reduced to nickeliferous iron or steel in an open-hearth gas-furnace.

Sixth. To the bath B, containing copper, nickel, and iron, must be added a portion of common salt, equal in weight to the copper in solution, or an equivalent quantity of either chloride of iron or chloride of calcium solutions of one or other of which are produced in a subsequent operation. If chloride of calcium be used, the resulting sulphate of lime must be separated from the bath before the next step be taken.

Seventh. Through the bath now containing chloride and sulphate of copper must be passed a stream of sulphurous-acid gas derived from burning brimstone or from the roasting in a suitable furnace or kiln of any sulphureted ore or matte. The sulphurous acid reduces all but a small percentage of the copper to insoluble subchloride, which separates as a heavy white precipitate, and can be readily converted into metallic copper by agitation with iron or into suboxide of copper by agitation with milk of lime. No other metal is separated, and therefore the nickel and iron remain in the bath, and as the bath is used over and over again these metals may be allowed to accumulate in it till it approaches saturation.

Eighth. Sulphurous acid acting on a solution of chloride of copper, as described in our patent, No. 227,902, not only reduces the copper to insoluble subchloride, but generates a quantity of sulphuric and hydrochloric acids equivalent to the quantity of copper thus reduced. In this way the acid necessary for the solution of the copper from another charge of ore or matte is regenerated. If the sulphurous-acid gas employed be diluted with air, which is in practice almost unavoidable, a further portion of sulphuric acid is thereby generated in addition to that produced by the reaction between the copper salts and the sulphurous acid and in excess, therefore, of what is required to dissolve the required quantity of copper from the matte or ore. Thus the acid consumed in dissolving so much of the nickel and iron as pass into solution is procured by the same operation and from the same source as that consumed in dissolving the copper, though by a different reaction.

Ninth. As already stated, the nickel and iron salts accumulate in the bath, which in time would become so saturated with the same that they would crystallize out in the leach-vats and elsewhere to the serious disturbance of all the operations. Such saturation is avoided by adding to the bath the weak liquors resulting from the final washing of the ore or matte and the solution of chloride of iron or chloride of calcium, resulting from the treatment of the subchloride of copper with iron or lime; but by keeping in this manner the bath below the point of saturation its bulk is necessarily increased, and this surplus quantity of bath is the only portion which should be treated for the separation of its nickel and iron contents. This surplus should be withdrawn from the bath after the bulk of its copper contents has been separated through the action of sulphurous acid. It then contains free sulphuric and hydrochloric acid, a small percentage of copper, and is nearly saturated with iron and nickel salts.

Tenth. To complete the separation of the copper, this surplus bath may be submitted to a weak electric current, using an insoluble anode. The copper will separate uncontaminated by either nickel or iron, or the surplus bath may be kept in contact with metallic iron till the copper has been precipitated; but it should be removed before the free acid has been neutralized by the iron. From the acid solution of nickel and iron thus freed from the last trace of copper the nickel and iron can be crystallized out as sulphates, or they may be precipitated as oxides by milk of lime or other precipitants. We prefer to crystallize out the nickel and iron as sulphates. The mother-liquors after such crystallization contains free acid, which may be returned to the bath, if necessary. From the crystallized salt of nickel and iron the acid may be distilled as Nordhausen acid, if there be a market for that product. Otherwise the sulphates can be calcined to perfect oxidation in any suitable furnace. In either case there will result oxides of nickel and iron, which can be added to the residues and treated in the same manner for the production of nickeliferous iron. The copper can be separated from the bath wholly by electrolysis; but in so doing the necessary excess of acid is not generated, and therefore we prefer the method above described. In cases where the mixed oxides of nickel and iron can be marketed as oxides smelting the same into an alloy of nickeliferous iron may be dispensed with.

Having thus described our invention, what we claim, and desire to secure by Letters Patent, is—

1. The hereinbefore-described method of separating copper from ore or matte containing copper pyrites and oxides of nickel and iron and recovering the nickel and iron as nickeliferous iron, which consists in crushing and thoroughly roasting the ore or matte, then digesting the mass in sulphuric acid to dissolve the copper oxide and a small quantity of iron and nickel, then separating the solution from the residue, then smelting the residue to produce nickeliferous iron, then adding a soluble chloride to the solution and subjecting it to a stream of sulphurous-acid gas in order to reduce the copper and generate acid, then precipitating the last traces of copper in the form of metallic copper, and, lastly, crystallizing the iron and nickel from the solution and calcining and smelting the crystals to produce nickeliferous iron.

2. The hereinbefore-described method of separating the copper from a solution containing copper oxide and oxides of iron and nickel to produce nickeliferous iron, which consists in first adding common salt to the said solution, then passing a stream of sulphurous-acid gas through the said solution, then precipitating the last traces of the copper in the form of metallic copper, and subsequently crystallizing out the nickel and iron and calcining and smelting the product to obtain nickeliferous iron, substantially as specified.

In testimony whereof we affix our signatures in presence of two witnesses.

THOMAS STERRY HUNT.
JAMES DOUGLAS.

Witnesses:
GEO. E. HOPKINS,
F. A. REED.